United States Patent [19]

Oehry et al.

[11] 3,940,588
[45] Feb. 24, 1976

[54] BOLT-WELDING GUN WITH MOVABLE SUPPORTING LEGS

[75] Inventors: Norbert Oehry; Rainer Wild, both of Schaan, Liechtenstein

[73] Assignee: Hilti Aktiengesellschaft, Schaan, Liechtenstein

[22] Filed: Sept. 24, 1974

[21] Appl. No.: 508,899

[30] Foreign Application Priority Data
Sept. 25, 1973 Germany............................ 2348174

[52] U.S. Cl. ........................ 219/98; 173/37; 227/7; 227/156; 248/13
[51] Int. Cl.²......................................... B23K 11/28
[58] Field of Search .......... 219/98, 99; 248/13, 163, 248/172; 173/31, 37

[56] References Cited
UNITED STATES PATENTS

| | | | |
|---|---|---|---|
| 2,115,707 | 5/1938 | Crecca et al........................... | 219/98 |
| 2,260,969 | 10/1941 | Crecca et al........................... | 219/98 |
| 2,462,882 | 3/1949 | Martin................................. | 219/98 X |
| 2,467,723 | 4/1949 | Barlow................................. | 219/98 |

*Primary Examiner*—C. L. Albritton
*Assistant Examiner*—D. A. Tone
*Attorney, Agent, or Firm*—Toren, McGeady and Stanger

[57] ABSTRACT

A bolt welding gun is provided with supporting legs extending outwardly from the gun housing which can be displaced to accommodate different bolt-attaching situations. The supporting legs can be mounted in a ring-shaped housing part which is rotatable about the driving axis of the gun. Alternatively, the ring-shaped housing part can be formed of individual segments with at least one segment arranged to be pivoted about an axis parallel to the driving axis. In another embodiment, the part of the housing to which the supporting legs are secured, can be provided with a plurality of receptacles greater in number than the supporting legs used so that the legs can be moved between the receptacles in accordance with the support arrangement desired.

8 Claims, 4 Drawing Figures

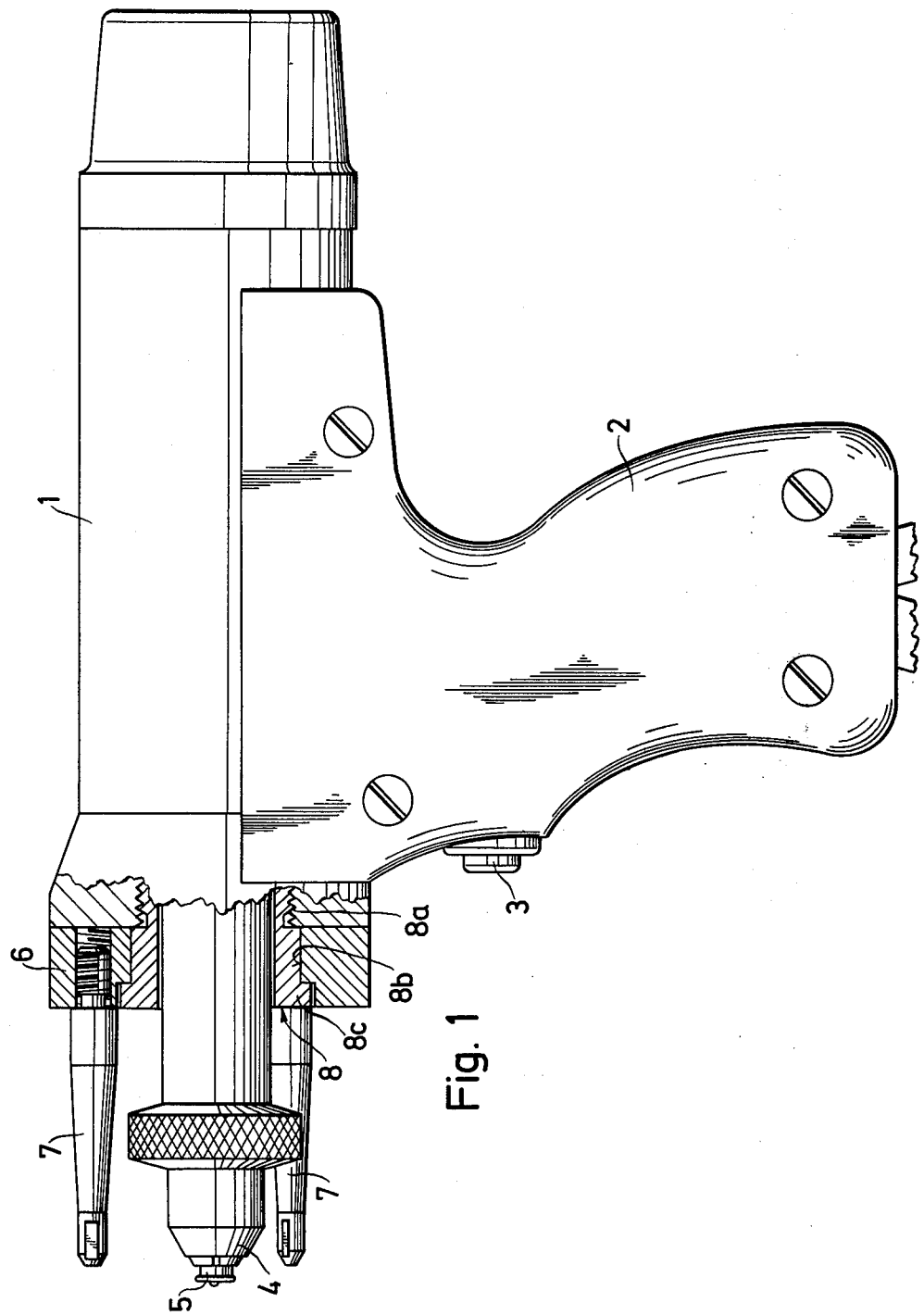

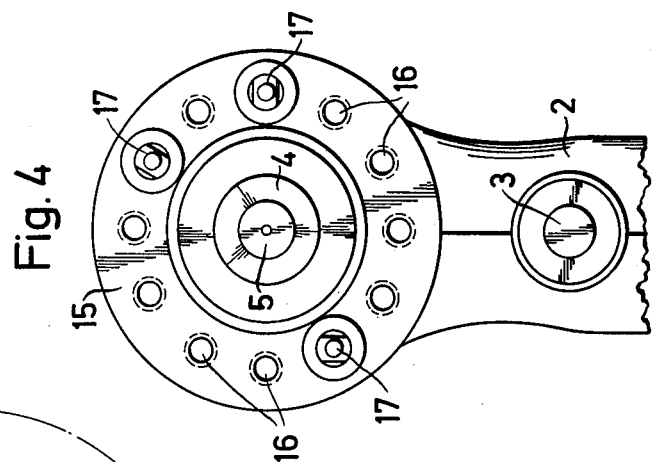
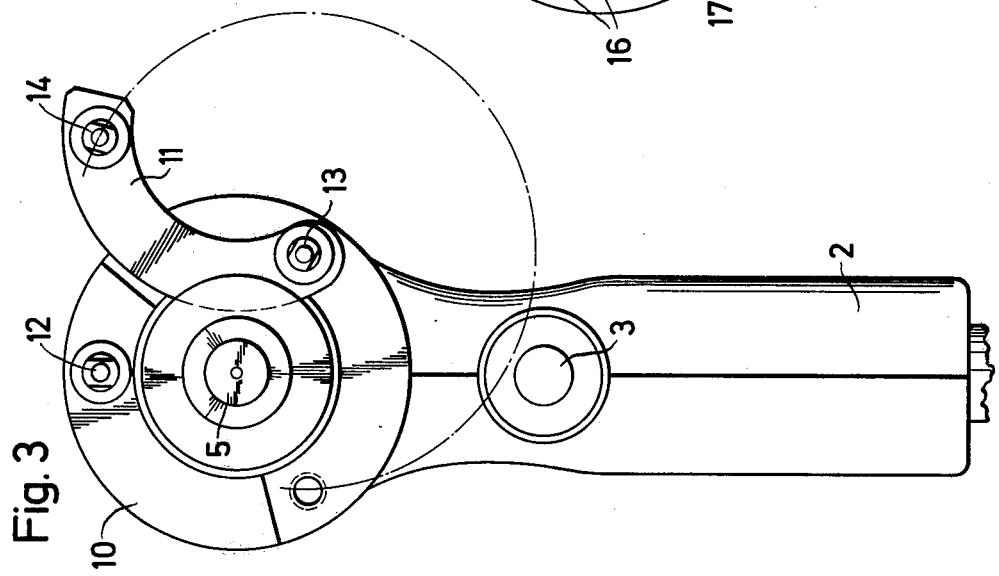
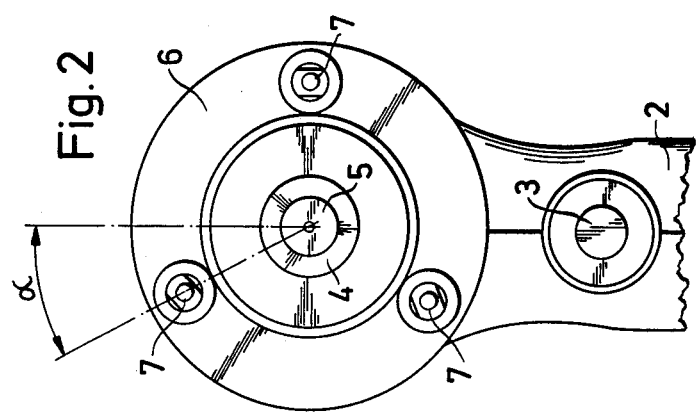

BOLT-WELDING GUN WITH MOVABLE SUPPORTING LEGS

SUMMARY OF THE INVENTION

The present invention is directed to a bolt-welding gun having supporting legs at its front end and, more particularly, it concerns an arrangement of the supporting legs so that they can be moved to accommodate different bolt-attaching situations.

Bolt-welding guns are known which have supporting legs rigidly secured to the front end of the housing. To afford a suitable bearing of the gun on a surface to which a bolt is to be attached, normally three supporting legs are used, that is, a three-point support. Generally, the supporting legs are arranged symmetrically about the bolt holder on the front end of the gun so that one supporting leg is aligned with the handle and the other two supporting legs are arranged one on the left side and the other on the right side of the handle.

In certain bolt attaching situations such an arrangement is not favorable. For example, when welding along an edge or a corner, it is better to position the supporting legs in a different manner, for instance, with one leg located on one side of the handle and the other two legs on the opposite side of the handle.

Furthermore, there are situations where the support for the welding gun adjacent the bolt to be welded in not possible. In such cases a portion of the supporting legs must be removed from the welding gun. However, aligning the bolt-welding gun into a perpendicular position to the work piece surface by sight does not usually afford good welding results.

Therefore, it is the primary object of the present invention to provide a bolt-welding gun in which the positions of the supporting legs can be adjusted to accommodate the various bolt-attaching situations encountered.

In accordance with the present invention, the problem of adjustably positioning the bolts can be solved by rotating the member supporting the legs about the driving axis of the gun or by arranging the part supporting the legs so that individual legs can be pivoted about an axis parallel to the driving axis.

If the supporting legs are positioned on a ring-shaped housing part which rotates about the driving axis of the gun, there is the advantage that the legs can be turned into any position symmetrically arranged with regard to the driving axis of the gun. In other words, the handle can be turned into a position which is best suited for operating the welding gun.

Turning the ring-shaped housing part about an axis parallel to the driving axis of the gun is advisable where support for the welding gun in the range of the bolt to be welded on is not possible. In such an instance, the bolt is then moved out of the triangle determined by the three supporting legs. Such an arrangement also improves the ability to view the welding site.

Since the collet in which the bolt to be welded is positioned, is, in most cases, mounted on the end face of the housing, it is advantageous if the ring-shaped housing part is formed of ring segments so that at least one of the segments can be pivoted about an axis parallel to but spaced from the driving axis of the gun. With this arrangement, an individual supporting leg can be displaced out of and then returned to a symmetrical position without involving the removal of the collet. Frequently, it is sufficient to turn one of the supporting legs into a mirror inverted position with regard to the connecting line of the other two legs.

Because the supporting legs are subject to considerable wear, it is advisable if they are detachably connected to the ring-shaped housing part. It is then possible to rapidly replace worn or damaged supporting legs, for instance, legs damaged by dropping the bolt welding gun. In situations where the bearing surface of the welding gun is not compatible with the surface to which the bolt is to be welded, for example, when the bolt is to be welded into a depression or on a raised surface, the differences can be easily compensated by replacing the legs.

To permit rapid replacement of the supporting legs, it is advantageous if the legs are threaded into the ring-shaped housing part. A threaded joint requires no special safety means and the supporting legs can be removed and replaced with the use of a few tools. Preferably, the supporting legs have a male thread and the ring-shaped housing part is provided with corresponding threaded bores.

Since a symmetrical distribution of the supporting legs is not always feasible, it is preferable if the ring-shaped housing part is provided with a greater number of receptacles than the number of supporting legs to provide an adequate support. Since a three-point support usually affords an adequate bearing surface for the welding gun, it is advantageous if the housing part contains at least four receptacles. However, a greater number of receptacles is possible, for instance, six or 12, positioned in an annular array on the ring-shaped housing part. In such an arrangement, the supporting legs can form the corners of a right-angled or equilateral triangle. For protection against metal slashes during welding, it is advantageous if the unused receptacles are closed with plugs or caps.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing FIG. 1 is an elevational view, partly in section, of a bolt welding gun embodying the present inventions;

FIG. 2 is a partial front view of the welding gun illustrated in FIG. 1, with the part of the gun mounting the supporting legs rotated through an angle $\alpha$;

FIG. 3 is a front view of a bolt-welding gun setting forth another embodiment of the invention with the part mounting the supporting legs consisting of individual ring segments with one segment pivoted outwardly; and FIG. 4 is a partial front view of another bolt setting gun embodying the present invention in which a plurality of individual receptacles are provided for the supporting legs.

DETAILED DESCRIPTION OF THE INVENTION

In FIG. 1 a bolt-welding gun is illustrated which includes a housing 1 with a handle 2 containing a release button 3 depending downwardly from the handle. A collet 4 is displaceably mounted on the front end of the housing and contains a bolt 5 in position to be welded to a receiving surface or work piece. At the front end of the housing 1, that is the end from which the bolts are welded to a surface, the supporting legs 7 are threaded into a ring-shaped housing part 6. A bush 8 is screwed into the housing by means of thread 8a. The bush 8 has a cylindrical part 8b which centers the ring-shaped housing part 6 and it also has an adjoining collar 8c which secures the housing part 6 in the direction of the driving axis.

In FIG. 2 the front end of the welding gun is illustrated with its ring-shaped housing part mounting the supporting legs 7 turned counterclockwise through the angle α. The extent of the angle of rotation illustrated in the drawing is provided only by way of example, any degree of rotation about the driving axis of the gun is possible.

In FIG. 3 the ring-shaped housing part 6 is formed of ring segments. One ring segment 10 is rigidly connected to the housing 1 or, as with the ring-shaped housing part in FIG. 2 it can be positioned for rotation about the driving axis of the gun. Segment 10 has two supporting legs 12, 13 fixed to it. A ring-segment 11 is mounted on the housing for pivotal movement about the supporting leg 13. A third supporting leg 14 is secured to the pivotally mounted second ring segment 11. Though only one of the ring segments is illustrated in FIG. 3 as being pivotally mounted, the ring-shaped housing part can be constructed so that two or all three of the supporting rings can be pivoted about an axis parallel but spaced radially outwardly from the driving axis of the gun.

In FIG. 4 the front end of the bolt welding gun has a ring-shaped housing part containing 12 receptacles 16 into which the three supporting legs 17 can be selectively fitted. The legs 17 can be arranged in the receptacles 16 in accordance with the conditions encountered in individual bolt welding situations. The receptacles are distributed in a uniform manner in an annular array around the driving axis of the gun. To protect the bores and the threaded surfaces within the receptacles which do not contain supporting legs at a particular time, it is advisable to cover or close the receptacles with a plug or cap.

While specific embodiments of the invention have been shown and described in detail to illustrate the application of the inventive principles, it will be understood that the invention may be embodied otherwise without departing from such principles.

We claim:

1. A bolt-welding gun having a front end from which bolts are welded to a surface, comprising a housing having a central axis extending in the direction in which the axes of bolts are oriented for attachment to a surface, a ring-shaped housing part secured to said housing at the front end of the gun, supporting legs mounted on and extending outwardly from the ring-shaped housing part in angularly spaced relation to provide at least a 3-point support for the gun as a bolt is welded onto a surface, wherein the improvement comprises that said ring-shaped housing is constructed for varying the positional relation of said supporting legs at least in relation to the central axis of said housing so that the position of said supporting legs can be changed in accordance with various conditions experienced in welding the bolts to a surface, and at least a portion of said ring-shaped housing part having at least one said supporting leg mounted thereon is pivotally displaceable about an axis disposed in spaced parallel relation with the central axis of the housing.

2. A bolt-welding gun, as set forth in claim 1, wherein said supporting legs are detachably connected to said ringshaped housing part.

3. A bolt-welding gun, as set forth in claim 2, wherein said supporting legs are threadedly connected to said ring-shaped housing part.

4. A bolt-welding gun, as set forth in claim 1, wherein said ring-shaped housing part has at least four receptacles formed therein for receiving and securably positioning said supporting legs on the welding gun.

5. A bolt-welding gun, as set forth in claim 4, wherein said receptacles are formed as threaded bores in said ring-shaped housing part and a cap member is provided for each of said receptacles for closing said receptacle when not in use for receiving one of the supporting legs to prevent damage to the interior of the receiving bore forming the receptacle.

6. A bolt-welding gun, as set forth in claim 1, wherein said ring-shaped housing part consists of a first ring segment rigidly connected to said housing, two of said supporting legs secured to said first ring segment, and a second ring segment pivotally mounted on said housing with one of said supporting legs secured to said second ring segment and being pivotally displaceable with said ring segment.

7. A bolt-welding gun, as set forth in claim 6, wherein said second ring segment is pivotally mounted about one of said supporting legs secured on said first ring segment.

8. A bolt-welding gun, as set forth in claim 1, wherein said ring-shaped housing part is rotatably displaceable about an axis co-axial with the central axis of said housing.

* * * * *